(12) United States Patent
Takahashi et al.

(10) Patent No.: US 6,907,152 B2
(45) Date of Patent: Jun. 14, 2005

(54) RING RESONATOR

(75) Inventors: Hidenori Takahashi, Saitama (JP); Masashi Usami, Saitama (JP); Kohsuke Nishimura, Saitama (JP)

(73) Assignee: KDDI Corporation, Tokyo (JP)

( * ) Notice: Subject to any disclaimer, the term of this patent is extended or adjusted under 35 U.S.C. 154(b) by 154 days.

(21) Appl. No.: 10/618,114

(22) Filed: Jul. 10, 2003

(65) Prior Publication Data

US 2004/0040646 A1 Mar. 4, 2004

(30) Foreign Application Priority Data

Aug. 30, 2002 (JP) .......................... 2002-253785
Dec. 12, 2002 (JP) .......................... 2002-360261

(51) Int. Cl.[7] .............................................. G20B 6/42
(52) U.S. Cl. ............................ 385/15; 385/14; 372/92
(58) Field of Search ......................... 385/14–24, 131; 372/45, 46, 92, 96

(56) References Cited

U.S. PATENT DOCUMENTS 5,926,496 A * 7/1999 Ho et al. ..................... 372/92
6,259,847 B1 * 7/2001 Lenz et al. .................. 385/131
6,289,151 B1    9/2001 Kazarinov et al.
6,411,752 B1 * 6/2002 Little et al. .................. 385/17
6,751,368 B2 * 6/2004 Lim et al. .................... 385/14

OTHER PUBLICATIONS

Horst, et al., "Tunable Ring Resonator Dispersion Compensators Realized in High–Refractive–Index Contrast SiON Technology", 26th European Conference on Optical Communication, Post Deadline Papers: Topic 2, Sep. 3–7, 2000, 4 pages, Munich Germany.

Suzuki, et al., "Ring resonators using hybrid stacked waveguides", The Institute of Electronics, Information and Communication Engineers, Autumn Conference, c–234, 1992, 3 pages.

* cited by examiner

Primary Examiner—Phan T. H. Palmer
(74) Attorney, Agent, or Firm—Christie, Parker and Hale, LLP

(57) ABSTRACT

A ring resonator comprises a ring waveguide (12) of a first relative refractive index difference having a narrow part (12a), and an optical waveguide (14) of a second relative refractive index difference smaller than the first relative refractive index difference. The optical waveguide is disposed adjacent to the narrow part to optically couple with the narrow part.

20 Claims, 7 Drawing Sheets

RING RESONATOR

CROSS REFERENCE TO RELATED APPLICATIONS

This application claims priority to Japanese Patent Application No. 2002-253785, filed on Aug. 30, 2002, and No. 2002-360261, filed on Dec. 12, 2002, the entire contents of which are incorporated herein by reference.

FIELD OF THE INVENTION

This invention generally relates to a ring resonator, and more specifically relates to an optical waveguide type ring resonator.

BACKGROUND OF THE INVENTION

An optical waveguide type ring resonator is formed by disposing an optical ring waveguide adjacent to an input/output optical waveguide and optically coupling both waveguides with a directional coupler.

A ring resonator usable as a dispersion compensator is described in F. Horst et al., "Tunable Ring Resonator Dispersion Compensators Realized in High-Refractive-Index Contrast SiON Technology", post deadline paper, European Conference on Optical Communications 2000. Since a group delay depends on a wavelength and a coupling coefficient between an input/output optical waveguide and an optical ring waveguide, a ring resonator can be used as a dispersion compensator by controlling the coupling coefficient so as to have dispersion characteristics of inverse symbol to chromatic dispersion in an optical fiber.

Furthermore, a ring resonator used for an add/drop optical filter is described in Senichi Suzuki et al., "Ring resonators using hybrid stacked waveguides", The Institute of Electronics, Information and Communication Engineers, Autumn Conference, c-234, 1992. In this case, it is also utilized to control filter characteristics by controlling a coupling coefficient.

A relative refractive index difference $\Delta n$ between a core and a clad of a single mode optical fiber (hereinafter, referred to SMF) is 0.3%, and a relative refractive index difference $\Delta n$ of a silica optical waveguide capable of optically coupling with the SMF at a low loss of 0.3 dB or less is within a range of 0.3% to 0.75%. When the relative refractive index difference between an input/output optical waveguide and an optical ring waveguide is set within a range of 0.3% to 0.75%, a free spectrum range (hereinafter, referred to FSR) of the optical ring waveguide becomes a maximum of 6 GHz or so.

In the former paper, an optical ring waveguide of a relative refractive index difference $\Delta n$ is set to 3.3% and a bend radius of 500 $\mu$m is formed to realize a FSR of 50 GHz. In the configuration described in the paper, a relative refractive index difference of an input/output optical waveguide is set to the same value with that of an optical ring waveguide. In the paper, to obtain a satisfactory optical coupling between the input/output optical waveguide having $\Delta n$ of 3.3% and the SMF having $\Delta n$ of 0.3%, disposing a mode converting optical fiber between them is proposed. It is reported that the coupling loss of one end face is reduced by 1.2 dB by disposing the mode converting optical fiber.

In the latter paper, by increasing $\Delta n$ of the optical ring waveguide and decreasing $\Delta n$ of the input/output optical waveguide, both wider FSR and connection with the optical fiber at low loss are realized. Specifically, by setting $\Delta n$ of the input/output optical waveguide to 0.75% and $\Delta n$ of the optical ring waveguide to 2%, a FSR of 21.6 GHz is realized without a mode converting optical fiber.

In the configuration described in the former paper, a mode converting optical fiber is required, and therefore the number of components increases making the circuit size larger. In addition, although the coupling efficiency is improved, the coupling loss is still as high as 1.2 dB.

According to the configuration in the latter paper, when $\Delta n$ of the optical ring waveguide is increased and $\Delta n$ of the input/output optical waveguide is decreased, the optical coupling efficiency between the SMF and the input/output optical waveguide improves, but the optical coupling efficiency between the input/output optical waveguide and the optical ring waveguide deteriorates. In the latter paper, it is described that the optical coupling efficiency between the input/output optical waveguide and the optical ring waveguide can be low. However, when it is used for dispersion compensation such that described in the former paper, the optical coupling efficiency between the input/output optical waveguide and the optical ring waveguide is sometimes required to be 70% to 100%. The configuration in the latter paper cannot be used for such use.

By increasing $\Delta n$ of the optical ring waveguide, basically, a circulation length can be shortened and as a result the FSR is extended. However, when $\Delta n$ of the optical ring waveguide is increased, the optical coupling efficiency between the input/output optical waveguide and the optical ring waveguide or between the SMF and the input/output optical waveguide deteriorates.

SUMMARY OF THE INVENTION

A ring resonator according to the invention comprises a ring waveguide of a first relative refractive index difference having a narrow part, and an optical waveguide of a second relative refractive index difference smaller than the first relative refractive index difference, the optical waveguide disposed adjacent to the narrow part to optically coupling with the narrow part.

Also, a ring resonator according to the invention comprises a ring waveguide of a first relative refractive index difference having first and second narrow parts, a first optical waveguide of a second relative refractive index difference smaller than the first relative refractive index difference, the first optical waveguide disposed adjacent to the first narrow part to optically couple with the first narrow part, and a second optical waveguide of a third relative refractive index difference smaller than the first relative refractive index difference, the second optical waveguide disposed adjacent to the second narrow part to optically couple with the second narrow part.

BRIEF DESCRIPTION OF THE DRAWINGS

The above and other objects, features and advantages of the present invention will be apparent from the following detailed description of embodiments of the invention in conjunction with the accompanying drawings, in which.

DETAILED DESCRIPTION

Embodiments of the invention are explained below in detail with reference to the drawings.

Figure 1:
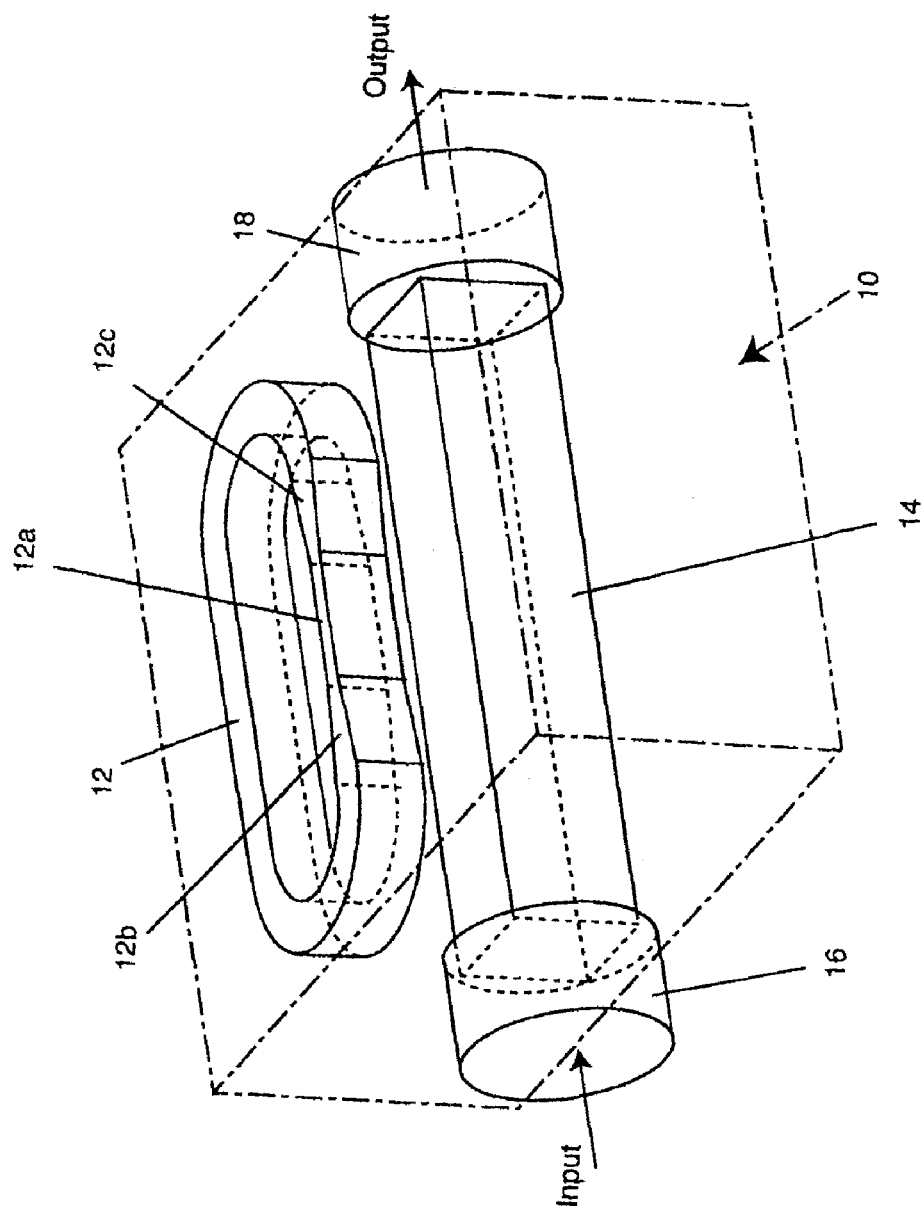
FIG. 1 is a perspective view of a first embodiment according to the invention.
Figure 2:
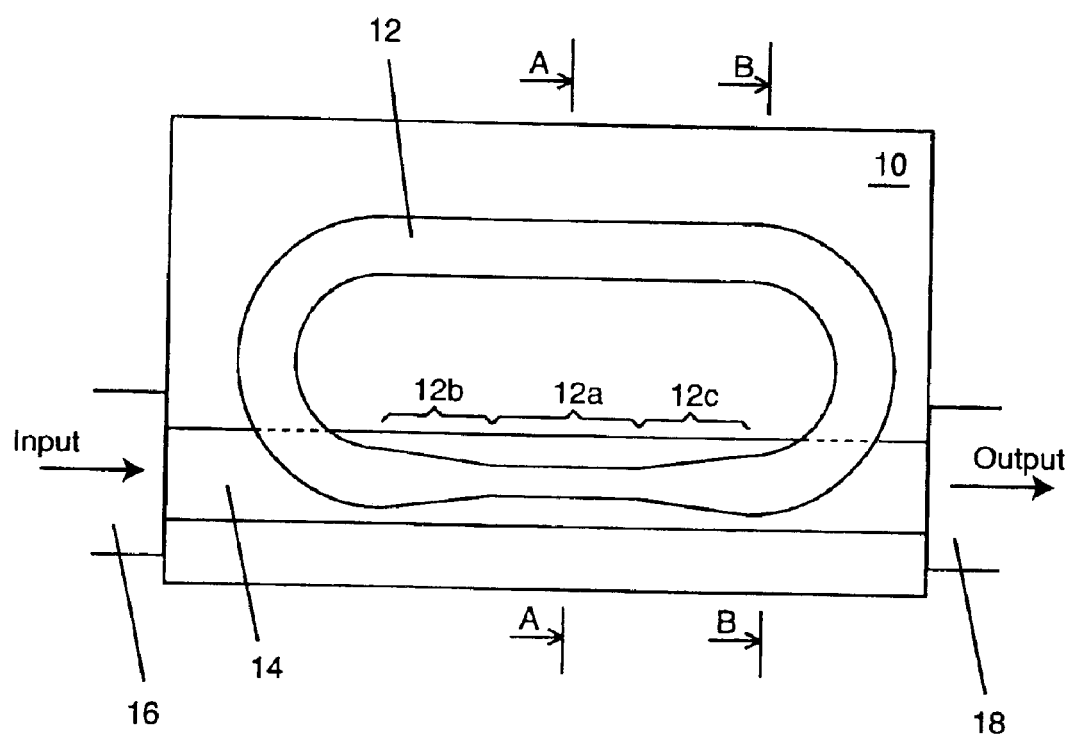
FIG. 2 is a plan view of the first embodiment.
Figure 3:
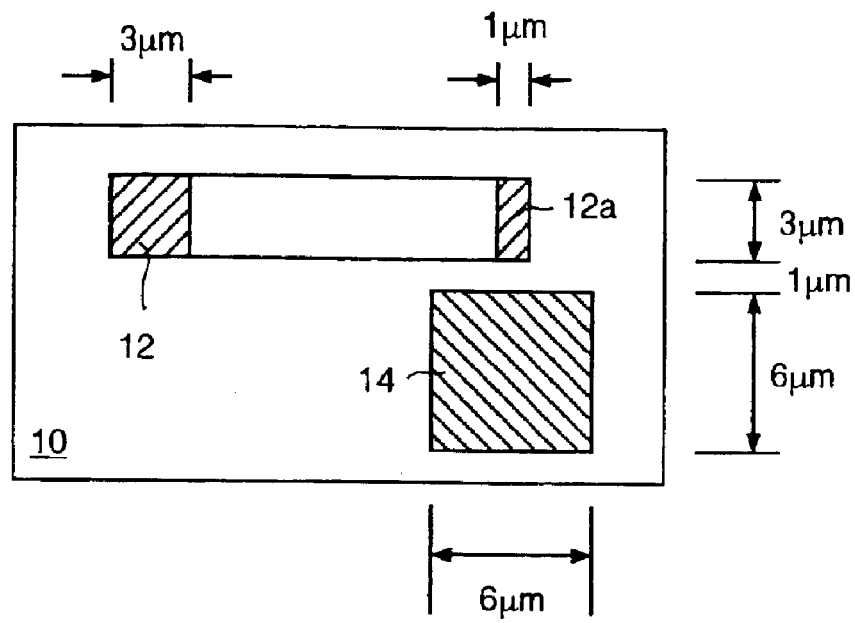
FIG. 3 is a sectional view taken on line A—A of FIG. 2.
Figure 4:
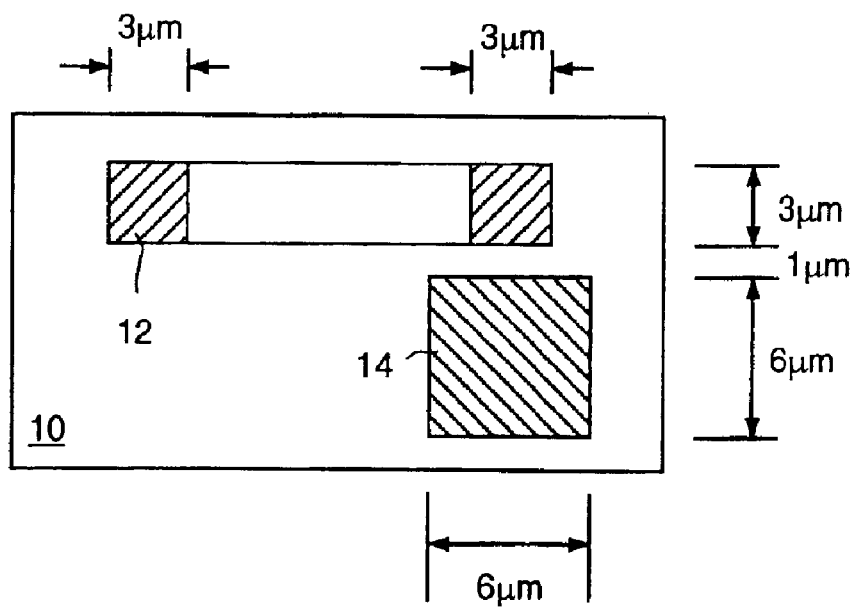
FIG. 4 is a sectional view taken on line B—B of FIG. 2.

FIG. 1 shows a perspective view of a first embodiment according to the invention, FIG. 2 shows a plan view thereof, FIG. 3 shows a sectional view taken on line A—A of FIG. 2, and FIG. 4 shows a sectional view taken on line B—B of FIG. 2.

An elliptical ring waveguide 12 and a straight optical waveguide 14 are embedded in a silica substrate 10. An optical waveguide 14 is disposed adjacent and parallel to a side of the ring waveguide 12. On the side of the ring waveguide 12 adjacent to the optical waveguide 14, a narrow part 12a is formed, its waveguide width is partly narrowed so as to optically couple with the optical waveguide 14 easily. On both sides of the narrow part 12a, 800 μm long tapered parts 12b and 12c, their waveguide widths taper toward the narrow part 12a are formed. The part formed by the narrow part 12a and the adjacent region of the optical waveguide 14 forms a directional coupler, and the length of optical transmission direction of the narrow part 12a is set to the length suitable for the directional coupling.

An SMF 16 is disposed on one end of the optical waveguide 14, and an SMF 18 is disposed on the other end of the optical waveguide 14. Each of the SMFs 16, 18 comprises optical fiber basically having the same refractive index distribution and refractive index.

In the embodiment, the relative refractive index difference Δn of the optical waveguide 14 is set to 0.75% and the sectional area is 6×6 μm. The relative refractive index difference Δn of the silica waveguide capable of coupling with the SMF having the relative refractive index difference Δn of 0.3% is, as described above, within a range of 0.3 to 0.75%, and the relative refractive index difference Δn of the optical waveguide 14 is set to the maximum value 0.75% within the range.

On top of the optical waveguide 14, the ring waveguides 12 are piled up at intervals of 1 μm. The relative refractive index difference Δn of the ring waveguide 12 is set to 2.3%, the minimum bend radius is set to 800 μm, and the perimeter is set to 8500 μm. The height of the ring waveguide 12 is set to 3 μm, the width is set to 3 μm in the most part and to 1 μm in the narrow part 12a, and in the tapered parts 12b and 12c, the width varies 3 μm to 1 μm in the range of 800 μm.

Since Δn of the optical waveguide 14 is set to 0.75% while Δn of the ring waveguide 12 is set to 2.3%, it is difficult to optically couple those waveguides as they are. However, in the embodiment, by providing the narrow part 12a to the ring waveguide 12, the optical coupling efficiency with the optical waveguide 14 is improved. That is, in the narrow part 12a, the propagation constant of a propagating light decreases to approach to the propagation constant of the optical waveguide 14, and sometimes it is even possible to coincide both propagation constants depending on a waveguide parameter. Accordingly, the directional coupling at the optical coupling efficiency of 70% or more can be realized between the ring waveguide 12 and the optical waveguide 14.

The light entered the optical waveguide 14 from a SMF 16 couples with the ring waveguide 12 at the narrow part 12a of the ring waveguide 12. The light circulated in the ring waveguide 12 couples with the optical waveguide 14 at the narrow part 12a to be output for a SMF 18. By disposing various optical elements, e.g. an optical element having a wavelength dependent transmission factor or chromatic dispersion, various optical function devices having a low insertion loss can be realized.

Figure 5:
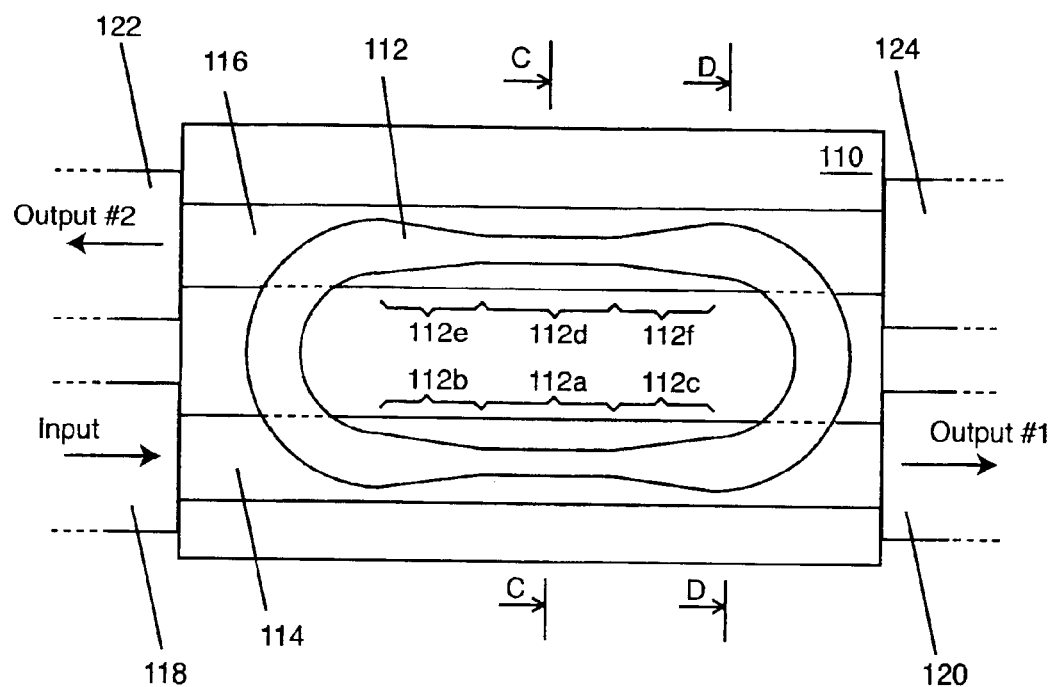
FIG. 5 is a plan view of a second embodiment according to the invention.
Figure 6:
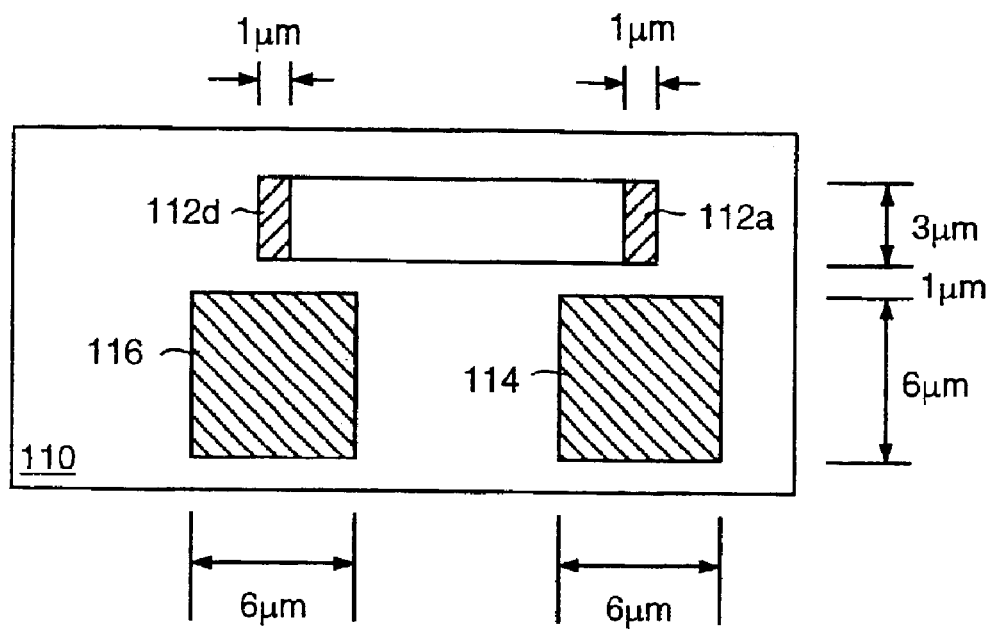
FIG. 6 is a sectional view taken on line C—C of FIG. 5.
Figure 7:
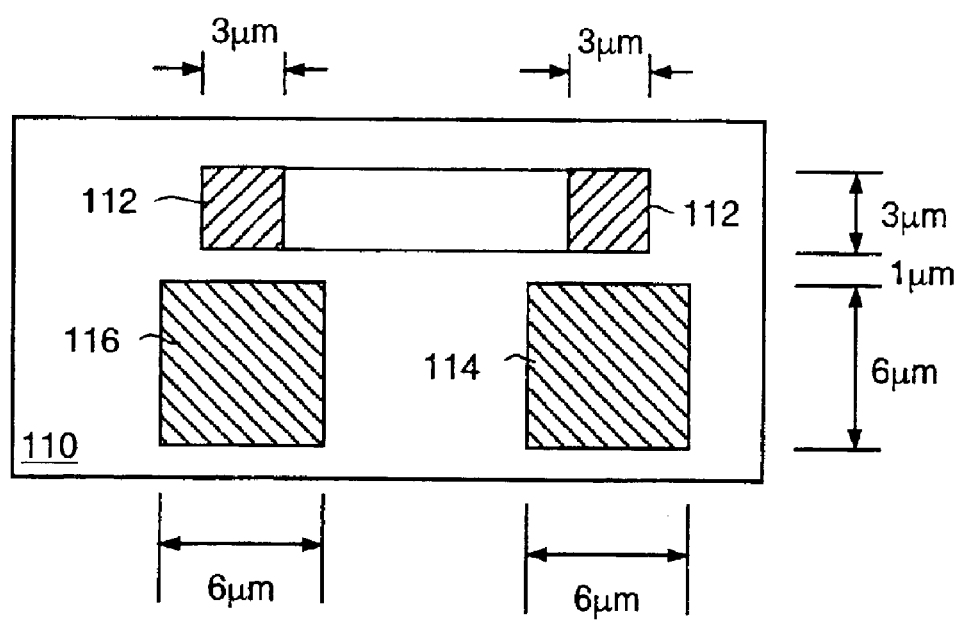
FIG. 7 is a sectional view taken on line D—D of FIG. 5.

FIG. 5 shows a plan view of a second embodiment according to the invention. FIG. 6 is a sectional view taken on line C—C of FIG. 5, and FIG. 7 shows a sectional view taken on line D—D of FIG. 5. The second embodiment is a so-called ring resonator optical filter configuration. The configuration is obtained by additionally providing narrow parts on two points of a ring waveguide and two optical waveguides optically coupling with the narrow parts respectively for the first embodiment.

In the embodiment shown in FIGS. 5 to 7, an elliptical ring waveguide 112 and straight optical waveguides 114 and 116 are embedded in a silica substrate 110. The optical waveguide 114 is disposed adjacent and parallel to a side of the ring waveguide 112, and the optical waveguide 116 is disposed adjacent and parallel to the other side of the ring waveguide 112.

In the side of the ring waveguide 112 to which the optical waveguide 114 is adjacent, a narrow part 112a is formed, its waveguide width is partly narrowed so as to optically couple with the optical waveguide 114 easily. On both sides of the narrow part 112a, 800 μm long tapered parts 112b and 112c, their waveguide widths taper toward the narrow part 112a are formed. This configuration is identical to that of the first embodiment. In the embodiment, a narrow part 112d and tapered parts 112e and 112f having the same configurations with the narrow width 112a and tapered parts 112b and 112c are further provided on the other side of the ring waveguide 112 to which the optical waveguide 116 is adjacent. In the narrow part 112d, the ring waveguide 112 optically couples with the optical waveguide 116 efficiently.

The part composed of the narrow part 112a and the optical waveguide 114 adjacent thereto forms a directional coupler, and the length of optical propagation direction of the narrow part 112a is set to a length suitable for the directional coupling. Similarly, the part composed of the narrow part 112d and the optical waveguide 116 adjacent thereto forms a directional coupler, and the length of optical propagation direction of the narrow part 112d is set to a length suitable for the directional coupling.

An SMF 118 is disposed on one end of the optical waveguide 114, and an SMF 120 is disposed on the other end of the optical guide 114. An SMF 122 is disposed on one end of the optical waveguide 116, and an SMF 124 is disposed on the other end of the optical waveguide 116.

The waveguide widths, height, and refractive index of the narrow parts 112a and 112d and tapered parts 112b, 112c, 112e, and 112f of the ring waveguide 112 are identical to those of the first embodiment. The waveguide widths, height, and refractive index of the optical waveguide (input/output waveguide) 114 and optical waveguide (output waveguide) 116 are identical to those of the optical waveguide 14 in the first embodiment. The distances between the narrow parts 112a and 112d of the ring waveguide 112 and the optical waveguides 114 and 116 are both 1 μm similarly to the case in the first embodiment.

In the embodiment, for instance, the light entered optical waveguide 114 from the SMF 118 is coupled with the ring waveguide 112 at the narrow part 112a in the ring waveguide 112. In the lights circulating the ring waveguide 112, a wavelength component (a drop band component) identical to the resonant frequency of the ring waveguide 112 is output for the SMF 122 through the waveguide 116 and the remaining wavelength component are output for the SMF 120. That is, the embodiment comprises a wavelength separating function for separating a specific wavelength component. In addition, the embodiment can get additional functions by disposing various optical elements on the ring waveguide. There is the correlation between a coupling efficiency of directional coupler and a drop bandwidth such that the drop bandwidth increases as a coupling efficiency increases. In the embodiment, a high coupling efficiency is easily realized, and therefore a wide drop bandwidth can be realized.

Figure 8:
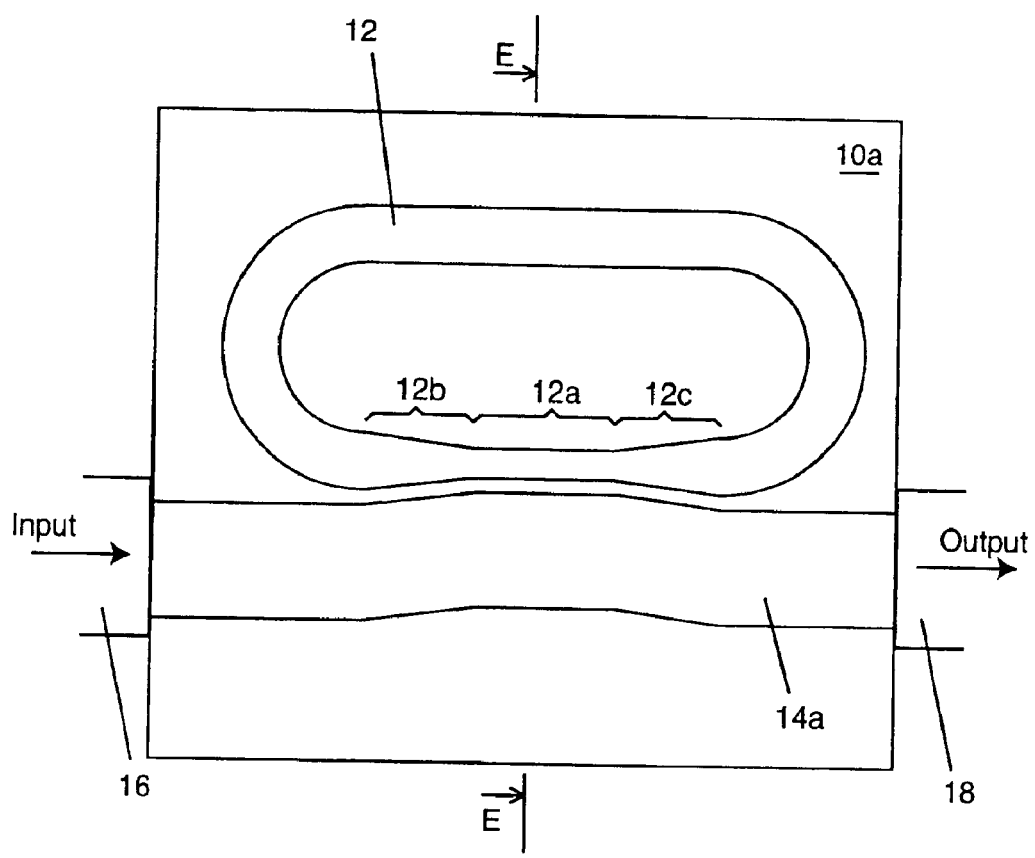
FIG. 8 is a plan view of a third embodiment according to the invention.
Figure 9:
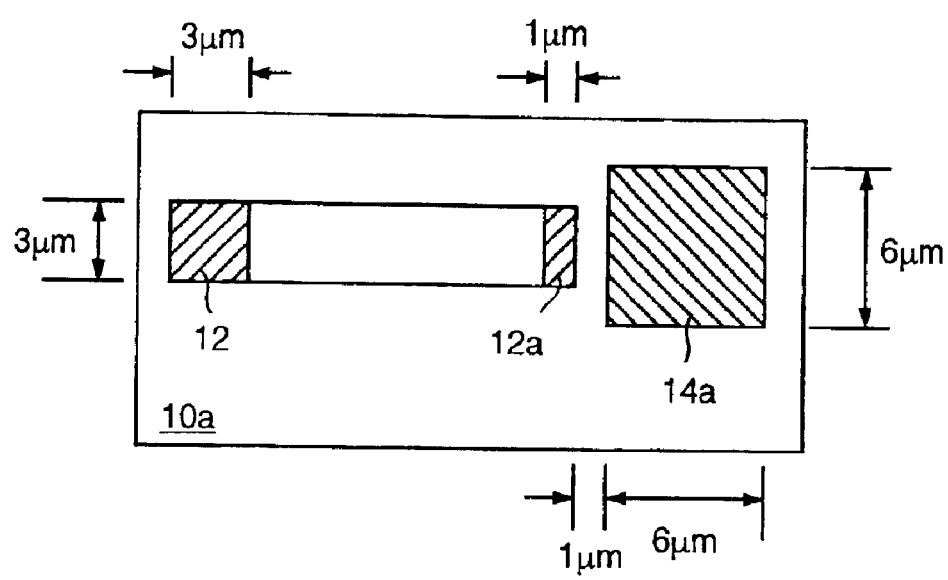
FIG. 9 is a sectional view taken on line E—E of FIG. 8.

In FIGS. 1 to 4, the configuration in which the ring waveguide 12 is disposed on the input/output optical waveguide 14 is shown, however it is also applicable that the input/output optical waveguide 14 is disposed next to the ring waveguide 12, namely on the surface practically identical to the surface that the ring waveguide 12 is disposed. In this case, to improve the efficiency of the directional coupling between the ring waveguide 12 and the input/output waveguide 14, the input/output waveguide 14 should be curved along the outer edge of the narrow part 12a in the ring waveguide 12. FIG. 8 shows a plan view of such a modified embodiment, and FIG. 9 shows a sectional view taken on line E—E of FIG. 8.

In the modified embodiment shown in FIG. 8, an input/output optical waveguide 14a corresponding to the input/output optical waveguide 14 is disposed next to the ring waveguide 12 on a substrate 10a. The input/output optical waveguide 14a is curved along the narrow part 12a and tapered parts 12b, 12c of the ring waveguide 12. The height and width of the input/output optical waveguide 14a are both set to 6 μm and constant in the optical propagation direction (the longitudinal direction).

In the second embodiment shown in FIGS. 5 to 7, it is also applicable that the optical waveguides 114 and 116 are disposed next to the ring waveguide 112. In such case, similarly to the waveguide disposition shown in FIG. 8, to improve the efficiency of the directional coupling between the ring waveguide 112 and the input/output optical waveguide 114, the input/output optical waveguide 114 should be curved along the outer edge of the narrow part 112a in the ring waveguide 112. Similarly to this, to improve the efficiency of the directional coupling between the ring waveguide 112 and input/output optical waveguide 116, the input/output optical waveguide 116 should be curved along the outer edge of the narrow part 112d in the ring waveguide 112.

Although the case to form the ring resonator according to the invention on the silica substrate was described, it is also applicable to form the ring resonator with a semiconductor.

As readily understandable from the aforementioned explanation, according to the invention, a ring resonator with a high optical coupling efficiency and a low loss is realized using fewer parts. In addition, it is easy to shorten the ring length and therefore a ring resonator with a large FSR is realized.

While the invention has been described with reference to the specific embodiment, it will be apparent to those skilled in the art that various changes and modifications can be made to the specific embodiment without departing from the spirit and scope of the invention as defined in the claims.

What is claimed is:

1. A ring resonator comprising:
   a ring waveguide of a first relative refractive index difference, the ring waveguide having a narrow part; and
   an optical waveguide of a second relative refractive index difference smaller than the first relative refractive index difference, the optical waveguide disposed adjacent to the narrow part to optically couple with the narrow part.

2. The ring resonator of claim 1 wherein the second relative refractive index difference is set to any of 0.3% to 0.75%.

3. The ring resonator of claim 1 wherein the ring waveguide further comprises tapered parts in which waveguide width gradually narrows and extends before and after the narrow part respectively.

4. The ring resonator of claim 1 wherein the first relative refractive index difference is about 2.3%.

5. The ring resonator of claim 1 wherein the narrow part of the ring waveguide has a first propagation constant and the optical waveguide has a second propagation constant and where the first propagation constant of the narrow part of the ring waveguide is approximately equal to the second propagation constant of the optical waveguide.

6. The ring resonator of claim 1 wherein the optical waveguide comprises a curved portion and wherein the curved portion of the optical waveguide is disposed adjacent to the narrow part of the ring waveguide to optically couple with the narrow part.

7. A ring resonator comprising:
   a ring waveguide of a first relative refractive index difference, the ring waveguide having first and second narrow parts;
   a first optical waveguide of a second relative refractive index difference smaller than the first relative refractive index difference, the first optical waveguide disposed adjacent to the first narrow part to optically couple with the first narrow part; and
   a second optical waveguide of a third relative refractive index difference smaller than the first relative refractive index difference, the second optical waveguide disposed adjacent to the second narrow part to optically couple with the second narrow part.

8. The ring resonator of claim 7 wherein each of the second and third relative refractive index differences is set to any of 0.3% to 0.75%.

9. The ring resonator of claim 7 wherein the second relative refractive index difference is approximately equal to the third relative refractive index difference.

10. The ring resonator of claim 7 wherein the ring waveguide further comprises a first pair of tapered parts in which waveguide width gradually varies in the first pair of tapered parts coupled before and after the first narrow part and a second pair of tapered parts in which the waveguide width gradually varies in the second pair of tapered parts coupled before and after the second narrow part.

11. A ring resonator comprising:
   a ring waveguide formed from first materials having a first relative refractive index difference between the first materials, a first portion of the ring waveguide having a first waveguide width and a second portion of the ring waveguide having a second waveguide width, the second waveguide width being less than the first waveguide width; and
   an optical waveguide formed from second materials having a second relative refractive index difference between the second materials, the second relative refractive index difference being smaller than the first relative refractive index difference, wherein the optical waveguide is disposed adjacent to the second portion of the ring waveguide to optically couple with the second portion.

12. The ring resonator of claim 11 wherein the second relative refractive index difference is in a range of about 0.3% to 0.75%.

13. The ring resonator of claim 11 wherein the ring waveguide further comprises a first tapered portion having a first tapered waveguide width adjacent a first end of the second portion of the ring waveguide and a second tapered portion having a second tapered waveguide width adjacent a second end of the second portion of the ring waveguide.

14. The ring resonator of claim 11 wherein the first relative refractive index difference is about 2.3%.

15. The ring resonator of claim 11 wherein the second portion of the ring waveguide has a first propagation constant and the optical waveguide has a second propagation constant and where the first propagation constant of the second portion of the ring waveguide is approximately equal to the second propagation constant of the optical waveguide.

16. The ring resonator of claim 11 wherein the optical waveguide comprises a curved portion and wherein the curved portion of the optical waveguide is disposed adjacent to the second portion of the ring waveguide to optically couple with the second portion.

17. A ring resonator comprising:
a ring waveguide formed from first materials having a first relative refractive index difference between the first materials, a first portion of the ring waveguide having a first waveguide width and a first narrow portion of the ring waveguide having a second waveguide width less than the first waveguide width and a second narrow portion having a third waveguide width less than the first waveguide width;
a first optical waveguide formed from second materials having a second relative refractive index difference between the second materials, the second relative refractive index difference being less than than the first relative refractive index difference, the first optical waveguide disposed adjacent to the first narrow portion of the ring waveguide to optically couple with the first narrow portion; and
a second optical waveguide formed from a third group of materials having a third relative refractive index difference, the third relative refractive index difference being less than the first relative refractive index difference, the third optical waveguide disposed adjacent to the second narrow portion of the ring waveguide to optically couple with the second narrow portion.

18. The ring resonator of claim 17 wherein each of the second and third relative refractive index differences is in a range of about 0.3% to 0.75%.

19. The ring resonator of claim 17 wherein the second relative refractive index difference is approximately equal to the third relative refractive index difference.

20. The ring resonator of claim 17 wherein the ring waveguide further comprises a first tapered portion having a first tapered waveguide width adjacent a first end of the first narrow portion of the ring waveguide, a second tapered portion having a second tapered waveguide width adjacent a second end of the first narrow portion of the ring waveguide, a third tapered portion having a third tapered waveguide width adjacent a first end of the second narrow portion of the ring waveguide and a fourth tapered portion having a fourth tapered waveguide width adjacent a second end of the second narrow portion of the ring waveguide.

* * * * *